(12) United States Patent
Choi et al.

(10) Patent No.: US 10,950,853 B2
(45) Date of Patent: Mar. 16, 2021

(54) NEGATIVE ELECTRODE ACTIVE MATERIAL HAVING AN INTERMEDIATE LAYER AND CARBON COATING LAYER, NEGATIVE ELECTRODE INCLUDING THE SAME, AND SECONDARY BATTERY INCLUDING THE NEGATIVE ELECTRODE

(71) Applicant: LG CHEM, LTD., Seoul (KR)

(72) Inventors: Jung Hyun Choi, Daejeon (KR); Dong Hyuk Kim, Daejeon (KR); Yong Ju Lee, Daejeon (KR); Eun Kyung Kim, Daejeon (KR); Rae Hwan Jo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 101 days.

(21) Appl. No.: 16/318,326

(22) PCT Filed: Feb. 26, 2018

(86) PCT No.: PCT/KR2018/002345
§ 371 (c)(1),
(2) Date: Jan. 16, 2019

(87) PCT Pub. No.: WO2018/164405
PCT Pub. Date: Sep. 13, 2018

(65) Prior Publication Data
US 2019/0288281 A1     Sep. 19, 2019

(30) Foreign Application Priority Data

Mar. 7, 2017  (KR) .................. 10-2017-0029115

(51) Int. Cl.
| | |
|---|---|
| *H01M 4/38* | (2006.01) |
| *H01M 2/10* | (2006.01) |
| *H01M 4/36* | (2006.01) |
| *H01M 4/485* | (2010.01) |
| *H01M 4/58* | (2010.01) |
| *H01M 4/62* | (2006.01) |
| *H01M 10/0525* | (2010.01) |
| *H01M 4/583* | (2010.01) |
| *H01M 4/48* | (2010.01) |
| *H01M 4/13* | (2010.01) |
| *H01M 4/02* | (2006.01) |

(52) U.S. Cl.
CPC ......... *H01M 4/386* (2013.01); *H01M 2/1072* (2013.01); *H01M 4/13* (2013.01); *H01M 4/364* (2013.01); *H01M 4/366* (2013.01); *H01M 4/483* (2013.01); *H01M 4/485* (2013.01); *H01M 4/58* (2013.01); *H01M 4/583* (2013.01); *H01M 4/625* (2013.01); *H01M 10/0525* (2013.01); *H01M 2004/027* (2013.01); *H01M 2220/10* (2013.01); *H01M 2220/20* (2013.01); *Y02E 60/10* (2013.01); *Y02T 10/70* (2013.01)

(58) Field of Classification Search
CPC ........ H01M 4/386; H01M 4/13; H01M 4/364; H01M 4/366; H01M 4/483; H01M 4/485; H01M 4/58; H01M 4/583; H01M 4/625; H01M 2/1072; H01M 10/0525
See application file for complete search history.

(56) References Cited

U.S. PATENT DOCUMENTS

| | | | |
|---|---|---|---|
| 9,905,842 B2 | 2/2018 | Kim et al. | |
| 10,305,097 B2 | 5/2019 | Kim et al. | |
| 2005/0031958 A1 | 2/2005 | Fukuoka et al. | |
| 2013/0143119 A1 | 6/2013 | Mah et al. | |
| 2014/0050983 A1 | 2/2014 | Kim et al. | |
| 2014/0110639 A1 | 4/2014 | Yamamura | |
| 2015/0280223 A1 | 10/2015 | Chang et al. | |
| 2016/0036049 A1* | 2/2016 | Wang ................... | H01M 4/133 429/229 |
| 2016/0141608 A1 | 5/2016 | Ryu et al. | |
| 2016/0336586 A1* | 11/2016 | Tuduki ................. | H01M 4/134 |
| 2017/0005329 A1 | 1/2017 | Kim et al. | |

FOREIGN PATENT DOCUMENTS

| | | |
|---|---|---|
| EP | 2698848 A1 | 2/2014 |
| EP | 2930146 A1 | 10/2015 |
| EP | 3113256 A1 | 1/2017 |
| JP | 5626531 B2 | 11/2014 |
| JP | 2015-125817 A | 7/2015 |
| KR | 10-1081615 B1 | 11/2011 |
| KR | 10-2013-0062105 A | 6/2013 |
| KR | 10-2014-0009583 A | 1/2014 |
| KR | 10-2014-0107926 A | 9/2014 |
| KR | 10-2016-0128279 A | 11/2016 |
| KR | 10-2016-0149862 A | 12/2016 |
| KR | 10-2017-0004673 A | 1/2017 |
| WO | WO 2015/145522 A1 | 10/2015 |

OTHER PUBLICATIONS

Yoshio Sara, "WO 2015145522 Translated", Published Oct. 1, 2015; Translated May 26, 2020 (Year: 2015).*
International Search Report issued in PCT/KR2018/002345 (PCT/ISA/210), dated Jun. 7, 2018.
Extended European Search Report, dated Sep. 30, 2019, for European Application No. 18764664.1.

* cited by examiner

*Primary Examiner* — Jimmy Vo
(74) *Attorney, Agent, or Firm* — Birch, Stewart, Kolasch & Birch, LLP

(57) ABSTRACT

A negative electrode active material including a core having $SiO_x$ ($0 \leq x < 2$), an intermediate layer covering at least a portion of a surface of the core and including at least one of silicon nitride or silicon oxynitride, and a carbon coating layer covering at least a portion of the intermediate layer and containing nitrogen.

14 Claims, No Drawings

NEGATIVE ELECTRODE ACTIVE MATERIAL HAVING AN INTERMEDIATE LAYER AND CARBON COATING LAYER, NEGATIVE ELECTRODE INCLUDING THE SAME, AND SECONDARY BATTERY INCLUDING THE NEGATIVE ELECTRODE

CROSS-REFERENCE TO RELATED APPLICATIONS

This application claims the benefit of Korean Patent Application No. 10-2017-0029115, filed on Mar. 7, 2017, in the Korean Intellectual Property Office, the disclosure of which is incorporated herein in its entirety by reference.

TECHNICAL FIELD

The present invention relates to a negative electrode active material, a negative electrode including the same, and a secondary battery including the negative electrode. Specifically, the negative electrode active material is characterized in including a core including $SiO_x$ ($0 \leq x < 2$), an intermediate layer covering at least a portion of a surface of the core and including at least one of silicon nitride or silicon oxynitride, and a carbon coating layer covering at least a portion of the intermediate layer and containing nitrogen.

BACKGROUND ART

Requirements for the use of alternative energy or clean energy have increased due to the rapid increase in the use of fossil fuels, and, as a part of this trend, power generation and electricity storage using an electrochemical reaction are the most actively researched areas.

Currently, a typical example of an electrochemical device using the electrochemical energy may be a secondary battery and there is a trend that its usage area is expanding more and more. In recent years, demand for secondary batteries as an energy source has been significantly increased as technology development and demand with respect to portable devices, such as portable computers, mobile phones, and cameras, have increased. Among these secondary batteries, lithium secondary batteries having high energy density, that is high capacity lithium secondary batteries have been subjected to considerable research and have been commercialized and widely used.

In general, a secondary battery is composed of a positive electrode, a negative electrode, an electrolyte, and a separator. The negative electrode includes a negative electrode active material for intercalating and de-intercalating lithium ions from the positive electrode, and as the negative electrode active material, a silicon-based particle having a high discharge capacity may be used. However, the silicon-based particle such as $SiO_x$ ($0 \leq x < 2$) have low initial efficiency, and the volume thereof changes excessively during a charge/discharge process. Therefore, the lifespan of a battery is deteriorated.

Typically, in order to solve such a problem, a $SiO_2$ layer or a carbon coating layer was formed on a surface of a silicon-based particle. However, even if the above method is used, the control of volume is not smoothly performed as a charge/discharge cycle of a battery continues, resulting in a problem that efficiency is lowered. In Korean Patent Laid-Open Publication No. 10-2016-0149862, a polymer complex is additionally disposed on a carbon coating layer to further control volume change.

However, even if a polymer complex is used, the control of volume change is not easy, and the conductivity of an active material is deteriorated, resulting in problems that resistance is increased and the capacity retention of a battery is deteriorated. In addition, lithium ions are not easily absorbed since a silicon-based particle is too covered, resulting in a problem that a capacity is deteriorated.

Therefore, there is a demand for the development of a negative electrode active material capable of effectively controlling volume change during a charge/discharge process of a secondary battery, reducing the resistance of a negative electrode, and increasing the capacity retention of a battery.

PRIOR ART DOCUMENT

Patent Document (Patent Document 1) Korean Patent Laid-Open Publication No. 10-2016-0149862

DISCLOSURE OF THE INVENTION

Technical Problem

An aspect of the present invention provides a negative electrode active material capable of effectively controlling volume change during a charge/discharge process of a secondary battery, reducing the resistance of a negative electrode, and increasing the capacity retention of a battery.

Technical Solution

According to an aspect of the present invention, there is provided a negative electrode active material including a core including SiOx ($0 \leq x < 2$), an intermediate layer covering at least a portion of a surface of the core and including at least one of silicon nitride or silicon oxynitride, and a carbon coating layer covering at least a portion of the intermediate layer and containing nitrogen.

According to another aspect of the present invention, there are provided a negative electrode including the negative electrode active material, and a secondary battery including the negative electrode.

Advantageous Effects

A negative electrode active material according to an embodiment of the present invention comprises an intermediate layer including at least one of silicon nitride or silicon oxynitride, and a carbon coating layer containing nitrogen so that conductivity of the negative electrode active material may be improved and volume change of a core in the negative electrode active material may be effectively controlled.

Through this, the capacity retention of a battery may be improved. In addition, when heat is excessively generated due to such as a short circuit in a battery, an increase in temperature due to the heat may be delayed, so that a series of exothermic reactions may be prevented.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

A negative electrode active material according to an embodiment of the present invention may include a core including SiOx (0≤x<2), an intermediate layer covering at least a portion of a surface of the core and including at least one of silicon nitride or silicon oxynitride, and a carbon coating layer covering at least a portion of the intermediate layer and containing nitrogen.

The core may include $SiO_x$ (0≤x<2). The $SiO_x$ (0≤x<2) may be in the form in which Si and $SiO_2$ are included. That is, the x corresponds to the number ratio of O to Si, both included in the $SiO_x$ (0≤x<2). When the core includes $SiO_x$ (0≤x<2), the discharge capacity of a secondary battery may be improved.

The average particle diameter ($D_{50}$) of the core may be 0.1 μm to 100 μm, specifically 1 μm to 10 μm. When the average particle diameter range is satisfied, a side reaction with an electrolyte is suppressed, and the oxidization of the core is controlled, so that the deterioration of initial efficiency may be prevented and there is an advantageous effect in a manufacturing process of an electrode. An average particle diameter ($D_{50}$) in the present specification may be defined as a particle diameter at 50% reference of a particle diameter distribution. The average particle diameter ($D_{50}$) may be measured by, for example, a laser diffraction method. In general, the laser diffraction method is capable of measuring a particle diameter to a degree from a submicron region to several millimeters, and results with high reproducibility and high degradability may be obtained.

The intermediate layer may cover at least a portion of a surface of the core. Specifically, the intermediate layer may cover the entire surface of the core. By the intermediate layer, the volume of the core may be effectively controlled so as not to be excessively expanded during a charge/discharge process of a battery.

The intermediate layer may include at least one of silicon nitride or silicon oxynitride. Specifically the intermediate layer may be composed of at least one of silicon nitride or silicon oxynitride. The silicon nitride may include $Si_3N_4$. The silicon oxynitride may be a compound represented by $SiO_mN_n$ (0<m≤2, 0<n≤4), and may specifically be $SiO_2N_2$ and/or $SiN_3O$. Since the intermediate layer includes at least one of silicon nitride or silicon oxynitride, the intercalation of lithium ions may be smoothly performed by nitrogen of silicon nitride or silicon oxynitride. Accordingly, the initial efficiency of a secondary battery may be improved. Furthermore, since at least one of silicon nitride or silicon oxynitride, both of which are stable at a high temperature, is present on a surface of the core, even when an exothermic reaction occurs due to a short circuit in a battery, an additional exothermic reaction occurring in the core may be suppressed. In addition, since at least one of silicon nitride or silicon oxynitride, both of which have a high hardness, is present on a surface of the core, the volume of the core may be effectively controlled so as not to be excessively expanded during a charge/discharge process of a battery. Through this, the capacity retention of the battery may be improved.

The thickness of the intermediate layer may be 1 nm to 100 nm, specifically 1 nm to 50 nm. When the thickness range is satisfied, the control of the volume change of the core may be effectively performed, and an additional exothermic reaction of the core may be effectively prevented. In addition, the ratio of the core is properly maintained so that an excessive decrease in discharge capacity may be prevented.

The intermediate layer may be formed by heat treating the core in an $N_2$ and/or $NH_3$ atmosphere, or by chemical vapor deposition (CVD) using silane gas and $NH_3$ gas as a source, but the embodiment of the present invention is not limited thereto.

The carbon coating layer may cover at least a portion of the intermediate layer. Specifically, the carbon coating layer may cover the entire intermediate layer. By the carbon coating layer, the volume of the core may be more effectively controlled so as not to be excessively expanded during a charge/discharge process of a battery, and the conductivity of an active material is increased so that the resistance of a negative electrode may be decreased.

The carbon coating layer may include nitrogen. Since the carbon coating layer includes nitrogen, the conductivity of the negative electrode active material may be further increased, and the intercalation of lithium ions may be smoothly performed. Furthermore, when the carbon coating layer is included in the negative electrode active material along with the intermediate layer, the hardness of a surface of the negative electrode active material may be further increased so that the control of volume change during the charge/discharge of a battery may be more effectively achieved.

In the carbon coating layer, the nitrogen may be included in an amount of 0.05 wt % to 17 wt %, specifically 0.1 wt % to 5 wt %, based on the total weight of the carbon coating layer. When the above range is satisfied, the conductivity of the carbon coating layer is increased so that the resistance of an electrode may be more effectively decreased.

The thickness of the carbon coating layer may be 1 nm to 100 nm, specifically 5 nm to 50 nm. When the above range is satisfied, the electrical conductivity of an electrode may be improved while maintaining a conductive path in the negative electrode active material.

The weight ratio of the intermediate layer to the carbon coating layer may be 1:99 to 20:80, specifically 5:95 to 15:85. When the weight ratio range is satisfied, the volume change of the core may be more effectively controlled, and the conductivity of a negative electrode active material may be further improved.

A negative electrode active material according to another embodiment of the present invention is the same as the negative electrode active material according to the embodiment described above, but is different in that the core may further include a metal compound. Therefore, the difference will be described.

The metal compound may be included in the core. The metal compound may be formed by oxidizing a metal having a reducing power capable of reducing the $SiO_x$ ($0≤x<2$), specifically reducing silicon dioxide ($SiO_2$) in the $SiO_x$ ($0≤x<2$) to silicon. The metal compound may include at least one of a metal oxide or a metal silicate.

The metal oxide may include one or two or more oxides selected from the group consisting of lithium (Li), magnesium (Mg), aluminum (Al), calcium (Ca), and titanium (Ti). Specifically, the metal oxide may be at least one of MgO, $Li_2O$, or $Al_2O_3$.

The metal silicate may include one or two or more silicates selected from the group consisting of lithium (Li), magnesium (Mg), aluminum (Al), calcium (Ca), and titanium (Ti). Specifically, the metal silicate may be at least one of $MgSiO_3$, $Mg_2SiO_4$, $Li_2SiO_3$, $Li_4SiO_4$, $Li_2Si_2O_5$, $Al_6SiO_{13}$, or $Al_4SiO_8$.

The metal compound may be formed by doping a metal in the core. By having the metal doped in the core, SiO and/or $SiO_2$ may be reduced, and the metal compound may be formed. Accordingly, the content of $SiO_2$ irreversibly acting in an initial stage may be reduced, so that the initial efficiency of a battery may be improved.

The metal compound may be included in an amount of 1 wt % to 60 wt %, specifically 2 wt % to 50 wt %, based on the total weight of the core. When the above range is satisfied, the initial efficiency of a battery may be further improved, and the size of a Si crystal in the core may be prevented from being excessively increased.

A negative electrode according to another embodiment of the present invention may include a negative electrode active material, and the negative electrode active material is the same as the negative electrode active materials of the embodiments described above. Specifically, the negative electrode may include a current collector, and a negative electrode active material layer disposed on the current collector. The negative electrode active material layer may include the negative electrode active material. Furthermore, the negative electrode active material layer may further include a binder and/or a conductive material.

The current collector is not particularly limited as long as it has conductivity without causing a chemical change in the battery. For example, as the current collector, copper, stainless steel, aluminum, nickel, titanium, fired carbon, or aluminum or stainless steel that is surface-treated with one of carbon, nickel, titanium, silver, and the like may be used. Specifically, a transition metal which adsorbs carbon well, such as copper and nickel, may be used as the current collector. The thickness of the current collector may be 6 μm to 20 μm, but the thickness of the current collector is not limited thereto.

The binder may include at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene-butadiene rubber (SBR), fluorine rubber, materials having the hydrogen thereof substituted with Li, Na, or Ca, and the like, and a combination thereof. In addition, the binder may include various copolymers thereof.

The conductive material is not particularly limited as long as it has conductivity without causing a chemical change in the battery. For example, as the conductive material, graphite such as natural graphite or artificial graphite; a carbonaceous material such as carbon black, acetylene black, Ketjen black, channel black, furnace black, lamp black, and thermal black; conductive fiber such as carbon fiber or metal fiber; a conductive tube such as a carbon nanotube; metal powder such as fluorocarbon, aluminum, and nickel powder; a conductive whisker such as a zinc oxide whisker and a potassium titanate whisker; a conductive metal oxide such as titanium oxide; a conductive material such as a polyphenylene derivative may be used.

A secondary battery according to another embodiment of the present invention may include a negative electrode, a positive electrode, a separator disposed between the positive electrode and the negative electrode, and an electrolyte. The negative electrode is the same as the negative electrode described above. Since the negative electrode has been described above, the detailed description thereof will be omitted.

The positive electrode may include a positive electrode current collector, and a positive electrode active material layer formed on the positive electrode current collector and including a positive electrode active material.

With respect to the positive electrode, the positive electrode current collector is not particularly limited as long as it has conductivity without causing a chemical change in a battery. For example, as the positive electrode current collector, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and on a surface of the positive electrode current collector, microscopic irregularities may be formed to improve the adhesion of the positive electrode active material. For example, the positive electrode current collector may be used in various forms such as a film, a sheet, a foil, a net, a porous body, a foam, a non-woven body, and the like.

The positive electrode active material may be a positive electrode active material commonly used in the art. Specifically, the positive electrode active material may be a layered compound such as lithium cobalt oxide ($LiCoO_2$) and lithium nickel oxide ($LiNiO_2$), or a compound substituted with one or more transition metals; a lithium manganese oxide such as $Li_{1+y1}Mn_{2-y1}O_4$ ($0≤y1≤0.33$), $LiMnO_3$, $LiMn_2O_3$, and $LiMnO_2$; lithium copper oxide ($Li_2CuO_2$); a vanadium oxide such as $LiV_3O_8$, $LiFe_3O_4$, $V_2O_5$, and $Cu_2V_2O_7$; a Ni-site type lithium nickel oxide represented by the formula $LiNi_{1-y2}M_{y2}O_2$ (wherein M is any one of Co, Mn, Al, Cu, Fe, Mg, B or Ga, and $0.01≤y2≤0.3$); a lithium manganese composite oxide represented by the formula $LiMn_{2-y3}M_{y3}O_2$ (wherein, M is any one of Co, Ni, Fe, Cr, Zn, or Ta, and $0.01≤y3≤0.1$), or by the formula $Li_2Mn_3MO_8$ (wherein, M is any one of Fe, Co, Ni, Cu, or Zn); $LiMn_2O_4$ having a part of Li in the formula substituted with an alkaline earth metal ion, and the like, but is not limited thereto. The positive electrode may be a Li-metal.

The positive electrode active material layer may include a positive electrode conductive material and a positive electrode binder along with the positive electrode active material described above.

At this time, the positive electrode conductive material is used to impart conductivity to the electrode and may be used without particular limitation as long as it has electron conductivity without causing a chemical change in a battery to be constituted. Specific examples of the positive electrode conductive material may include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used as the positive electrode conductive material.

Also, the binder serves to improve the bonding between positive electrode active material particles and the adhesion between the positive electrode active material and the positive electrode current collector. Specific examples of the binder may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used as the binder.

The separator is to separate the negative electrode and the positive electrode and to provide a movement path for lithium ions. Any separator may be used without particular limitation as long as it is typically used as a separator in a secondary battery. Particularly, a separator having excellent moisture-retention of an electrolyte as well as low resistance to the ion movement in the electrolyte is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used as the separator. Also, a coated separator including a ceramic component or a polymer material may be used to secure heat resistance or mechanical strength, and may be selectively used having a single layered or a multilayered structure.

The electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the manufacturing of a lithium secondary battery, but is not limited thereto.

Specifically, the electrolyte may include a non-aqueous organic solvent and a lithium salt.

As the non-aqueous organic solvent, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxy franc, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate may be used.

In particular, among the carbonate-based organic solvents, cyclic carbonates ethylene carbonate and propylene carbonate may be preferably used since they are organic solvents of a high viscosity having high permittivity to dissociate a lithium salt well. Furthermore, such a cyclic carbonate may be more preferably used since the cyclic carbonate may be mixed with a linear carbonate of a low viscosity and low permittivity such as dimethyl carbonate and diethyl carbonate in an appropriate ratio to prepare an electrolyte having a high electric conductivity.

As the metal salt, a lithium salt may be used. The lithium salt is a material which is easily dissolved in the non-aqueous electrolyte.

In order to improve the lifespan properties of a battery, suppress the decrease in battery capacity, and improve the discharge capacity of the battery, the electrolyte may further include one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride other than the above electrolyte components.

According to another embodiment of the present invention, a battery module including the secondary battery as a unit cell, and a battery pack including the same are provided. The battery module and the battery pack include the secondary battery which has a high capacity, high rate performance properties and cycle properties, and thus, may be used as a power source of a medium-and-large sized device selected from the group consisting of an electric vehicle (e.g., electric car), a hybrid electric vehicle, a plug-in hybrid electric vehicle, and a power storage system.

Hereinafter, preferred embodiments of the present invention will be described in detail to facilitate the understanding of the present invention. However, the embodiments are merely illustrative of the present invention, and thus, it will be apparent to those skilled in the art that various modifications and variations can be made without departing from the scope and spirit of the present invention as disclosed in the accompanying claims. It is obvious that such variations and modifications fall within the scope of the appended claims.

EXAMPLES AND COMPARATIVE EXAMPLES

Example 1: Manufacturing of Electrode (1) Manufacturing of a Negative Electrode Active Material 10 g of SiO having an average particle diameter ($D_{50}$) of 5 μm was prepared and silane gas ($SiH_4$) and ammonia gas ($NH_3$) were introduced thereto, followed by a CVD treatment at 800° C. to form an intermediate layer (silicon nitride layer) on the SiO. When measured using the XPS depth profile (etching rate: 1 nm/10 sec, etching time: 50 sec), the thickness of the formed intermediate layer was about 5 nm. In addition, when measured using the ONH component analyzer, the content of nitrogen included in the intermediate layer was 0.5 wt %. Thereafter, methane gas ($CH_4$) and ammonia gas were introduced at a ratio of 1:1, and CVD was performed to form a carbon coating layer (thickness: 20 nm) including nitrogen on the intermediate layer. Through this, a negative electrode active material of Example 1 was manufactured. When measured using the ONH component analyzer, the content of nitrogen included in the negative electrode active material was 18 wt %. When the content of nitrogen included in the intermediate layer, which is 0.5 wt %, is subtracted from the content of nitrogen included in the negative electrode active material, the content of nitrogen in the carbon coating layer is confirmed to be 17.5 wt %.

(2) Manufacturing of Negative Electrode

The negative electrode active material, fine graphite as a conductive material, and polyacrylonitrile as a binder were mixed in a weight ratio of 7:2:1 to manufacture a 0.2 g of mixture. As a solvent, 3.1 g of N-methyl-2-pyrrolidone (NMP) was added to the mixture to manufacture a negative electrode mixture slurry. The negative electrode mixture slurry was applied on a copper (Cu) metal thin film which is a negative electrode current collector having a thickness of 20 μm, and then the applied negative electrode current collector was dried. At this time, the temperature of circulating air was 80° C. Subsequently, the dried negative electrode current collector was roll pressed, and then dried in a vacuum oven at 130° C. for 12 hours to manufacture a negative electrode.

(3) Manufacturing of Secondary Battery

The manufactured negative electrode was cut into a circular shape of 1.4875 cm² to be used as a negative electrode, and a lithium (Li) metal thin film cut into a circular shape of 1.7671 cm² was used as a positive electrode. Between the positive electrode and the negative electrode, a separator of porous polyethylene was disposed, 0.5 wt % of vinylene carbonate was dissolved in a mixed solution in which methyl ethyl carbonate (EMC) and ethylene carbonate (EC) were mixed in a mixing volume ratio of 7:3, and an electrolyte in which $LiPF_6$ having a concentration of 1 M was dissolved was introduced to manufacture a lithium coin half-cell.

Example 2: Manufacturing of Battery (1) Manufacturing of a Negative Electrode Active Material An intermediate layer was formed on a core in the same manner as in Example 1. Thereafter, methane gas ($CH_4$) and ammonia gas were introduced at a ratio of 1:2 to perform CVD in order to form a carbon coating layer (thickness: 20 nm) including nitrogen on the intermediate layer. Through this, a negative electrode active material of Example 2 was manufactured. When measured using the ONH component analyzer, the content of nitrogen included in the carbon coating layer was confirmed to be 3.2 wt %.

(2) Manufacturing of a Negative Electrode and a Secondary Battery

Using the above negative electrode active material, a negative electrode and a secondary battery were manufactured in the same manner as in Example 1.

Example 3: Manufacturing of Battery (1) Manufacturing of a Negative Electrode Active Material An intermediate layer was formed on a core in the same manner as in Example 1. Thereafter, methane gas ($CH_4$) and ammonia gas were introduced at a ratio of 1:2 to perform CVD, and then a carbon coating layer (thickness: 20 nm) including nitrogen was formed on the intermediate layer to manufacture preliminary particles. When measured using the ONH component analyzer, the content of nitrogen included in the carbon coating layer was confirmed to be 3.2 wt %.

Thereafter, 10 g of the preliminary particles, 0.8 g of Mg powder were mixed in an Ar atmosphere to prepare mixed powder. The mixed powder was placed into a tube furnace, heated to 950° C. at a rate of 5° C./min in an Ar gas atmosphere, and then subjected to a heat treatment for 2 hours. Thereafter, the temperature of the furnace was lowered to room temperature, and the heat-treated mixed powder was taken out to be washed by being stirred with HCl of 1 M for 1 hour. The washed mixed powder was washed with distilled water while being filtered, and then dried in an oven at 60° C. for 8 hours. Through this, a negative electrode active material including a core containing a metal compound including MgO, $Mg_2SiO_4$, and $MgSiO_3$ was manufactured. When measured by the XRD quantitative analysis, the metal compound was confirmed to be included in the core in an amount of 30 wt % based on the total weight of the core.

(2) Manufacturing of Negative Electrode and Secondary Battery

Using the above negative electrode active material, a negative electrode and a secondary battery were manufactured in the same manner as in Example 1.

Example 4: Manufacturing of Battery (1) Manufacturing of a Negative Electrode Active Material An intermediate layer was formed on a core in the same manner as in Example 1. Thereafter, methane gas ($CH_4$) and ammonia gas were introduced at a ratio of 1:2 to perform CVD, and then a carbon coating layer (thickness: 20 nm) including nitrogen was formed on the intermediate layer to manufacture preliminary particles. When measured using the ONH component analyzer, the content of nitrogen included in the carbon coating layer was confirmed to be 3.2 wt %.

Thereafter, 10 g of the preliminary particles, 0.8 g of Li powder were mixed in an Ar atmosphere to prepare mixed powder. The mixed powder was placed in a tube furnace, heated to 950° C. at a rate of 5° C./min in an Ar gas atmosphere, and then subjected to a heat treatment for 2 hours. Thereafter, the temperature of the furnace was lowered to room temperature, and the heat-treated mixed powder was taken out. Through this, a negative electrode active material including a core containing a metal compound including $Li_2SiO_3$, $Li_4SiO_4$, and $Li_2Si_2O_5$ was manufactured. When measured by the XRD quantitative analysis, the metal compound was confirmed to be included in the core in an amount of 40 wt % based on the total weight of the core.

(2) Manufacturing of Negative Electrode and Secondary Battery

Using the above negative electrode active material, a negative electrode and a secondary battery were manufactured in the same manner as in Example 1.

Comparative Example 1: Manufacturing of Battery (1) Manufacturing of Negative Electrode Active Material A core having an intermediate layer was manufactured in the same manner as in Example 1, and CVD was performed using methane gas as a source. Through this, a negative electrode active material including a carbon coating layer (thickness: 20 nm) not including nitrogen was manufactured.

(2) Manufacturing of Negative Electrode and Secondary Battery

Using the above negative electrode active material, a negative electrode and a secondary battery were manufactured in the same manner as in Example 1.

Comparative Example 2: Manufacturing of Battery (1) Manufacturing of Negative Electrode Active Material
Methane gas ($CH_4$) and ammonia gas were introduced to 10 g of SiO having an average particle diameter ($D_{50}$) of 5 μm to perform CVD. Through this, a carbon coating layer (thickness: 20 nm) including nitrogen was formed on SiO. In the formed carbon coating layer, the content of nitrogen was 3.0 wt %.

(2) Manufacturing of Negative Electrode and Secondary Battery
Using the above negative electrode active material, a negative electrode and a secondary battery were manufactured in the same manner as in Example 1.

Comparative Example 3: Manufacturing of Battery (1) Manufacturing of Negative Electrode Active Material
10 g of SiO having an average particle diameter ($D_{50}$) of 5 μm was prepared, and then exposed to ultraviolet rays through an ultraviolet-ozone scrubber under the condition of ozone in which moisture was blocked at normal pressure. Through this, a surface of the SiO was oxidized to form an oxide layer. Thereafter, methane gas ($CH_4$) and ammonia gas were introduced at a ratio of 1:2 to perform CVD, and then a carbon coating layer (thickness: 20 nm) including nitrogen was formed on the intermediate layer to manufacture preliminary particles. In the formed carbon coating layer, the content of nitrogen was 3.5 wt %.

(2) Manufacturing of a Negative Electrode and a Secondary Battery
Using the above negative electrode active material, a negative electrode and a secondary battery were manufactured in the same manner as in Example 1.

Experimental Example 1. Evaluation of Discharge Capacity, Initial Efficiency, Capacity Retention, and Electrode Thickness Change Rate The batteries of Examples 1 to 4 and Comparative Examples 1 to 3 were charged/discharged to evaluate the discharge capacity, the initial efficiency, the capacity retention, and the electrode thickness change rate, and the results are shown in Table 1 below.

Meanwhile, the first cycle and the second cycle were charged/discharged at 0.1 C, and from the third cycle to the 49th cycle, charge/discharge was performed at 0.5 C. The 50th cycle was terminated in the state of charging (in which lithium is in the negative electrode), and the batteries were disassembled to measure the thickness thereof, and the electrode thickness change rate was calculated.

Charge conditions: CC (constant current)/CV (constant voltage) (5 mV/0.005 C currentcut-off)
Discharge conditions: CC (constant current) Condition 1.5V The discharge capacity (mAh/g) and the initial efficiency (%) were derived from the results of one charge/discharge cycle. Specifically, the initial efficiency (%) was derived by the following calculation.

Initial efficiency (%)=(discharge capacity after the first discharge/first charge capacity)×100

The capacity retention (%) and the electrode thickness change rate were derived by the following calculation, respectively.

Capacity retention (%)=(discharge capacity after the $49^{th}$ discharge/first discharge capacity)×100

Electrode thickness change rate (%)=(final electrode thickness variation/initial electrode thickness)×100

TABLE 1

| Battery | Discharge capacity (mAh/g) | Initial efficiency (%) | Capacity retention (%) | Electrode thickness change rate (%) |
|---|---|---|---|---|
| Example 1 | 1540 | 75.7 | 84 | 114 |
| Example 2 | 1570 | 76.8 | 85 | 105 |
| Example 3 | 1410 | 82.3 | 56 | 126 |
| Example 4 | 1290 | 88.0 | 50 | 128 |
| Comparative example 1 | 1501 | 74.5 | 47 | 155 |
| Comparative example 2 | 1530 | 75.0 | 0.1 | 170 |
| Comparative example 3 | 1350 | 71.3 | 30 | 155 |

Referring to Table 1 above, in the cases of Examples 1 to 4 in which both the intermediate layer (silicon nitride layer) and the carbon coating layer including nitrogen are included, the initial efficiency and the capacity retention were excellent and the electrode thickness change was small compared with Comparative Examples 1 to 3 in which only one thereof is included. In particular, when the negative active material having the oxide layer instead of the silicon nitride layer was used (Comparative Example 3), the conductivity of the negative electrode active material was deteriorated, the irreversible capacity was increased, so that the discharge capacity and the initial efficiency were low.

Furthermore, in the case of Example 2 in which the content of nitrogen was at an appropriate level, the discharge capacity, the initial efficiency, and the capacity retention were all excellent, and the electrode thickness change was small compared with Example 1 in which the content of nitrogen was rather large.

In addition, in the cases of Examples 3 and 4 in which the metal compound was included in the core, the initial efficiency was much higher than that of Examples 1 and 2 in which the metal compound was not included.

Experimental Example 2: Evaluation of Thermal Stability

The batteries of Examples 1 to 4 and Comparative Examples 1 to 3 were charged first in full, and subjected to High Pressure Differential Scanning calorimetry (HP-DSC). Through this, the thermal stability was evaluated, and the results are shown in Table 2 below.

Charge conditions: CC (constant current)/CV (constant voltage) (5 mV/0.005 C currentcutoff)

Specifically, the first cycle was charged in full at 0.1 C and the coin cell was disassembled in a dry room to collect only the negative electrode. The collected negative electrode was placed in the HP-DSC pan, and 20 μl of an electrolyte was introduced thereto, and then heated from 35° C. to 600° C. at a temperature increase condition of 10° C./min using the HP-DSC (EQC-0277, Setaram).

TABLE 2

| Battery | Onset temperature (° C.) | Main peak (° C.) | Heating values with respect to the negative electrode active material(kJ/g) |
|---|---|---|---|
| Example 1 | 247 | 281 | 12.6 |
| Example 2 | 251 | 286 | 10.7 |
| Example 3 | 244 | 285 | 12.3 |
| Example 4 | 243 | 284 | 12.9 |
| Comparative example 1 | 220 | 284 | 13.7 |

TABLE 2-continued

| Battery | Onset temperature (° C.) | Main peak (° C.) | Heating values with respect to the negative electrode active material(kJ/g) |
|---|---|---|---|
| Comparative example 2 | 213 | 286 | 14.3 |
| Comparative example 3 | 232 | 285 | 13.0 |

Referring to Table 2 above, it can be seen that the onset temperature of Examples is higher than that of Comparative Examples. This means that, in the case of a battery using the negative electrode active material of the present invention, when an exothermic reaction occurs in the battery due to an internal short circuit or an impact, a series of exothermic reactions may be prevented by delaying an increase in temperature due to the heat. It can be also confirmed that Examples have lower heating values with respect to the negative electrode active material than Comparative Examples.

The invention claimed is:

1. A negative electrode active material, comprising:
a core including $SiO_x$ ($0 \leq x < 2$);
an intermediate layer covering at least a portion of a surface of the core and including at least one of silicon nitride or silicon oxynitride; and
a carbon coating layer covering at least a portion of the intermediate layer and containing nitrogen,
wherein a weight ratio of the intermediate layer to the carbon coating layer is 1:99 to 20:80,
wherein the nitrogen in the carbon coating layer is included in an amount of 0.1 wt % to 5 wt % based on a total weight of the carbon coating layer.

2. The negative electrode active material of claim 1, wherein an average particle diameter ($D_{50}$) of the core is 0.1 μm to 100 μm.

3. The negative electrode active material of claim 1, wherein the core further comprises a metal compound, and wherein the metal compound comprises at least one of a metal oxide or a metal silicate.

4. The negative electrode active material of claim 3, wherein the metal compound is the metal oxide and the metal oxide comprises one or two or more oxides selected from the group consisting of Li, Mg, Al, Ca, and Ti.

5. The negative electrode active material of claim 3, wherein the metal compound is the metal silicate and the metal silicate includes one or two or more silicates selected from the group consisting of Li, Mg, Al, Ca, and Ti.

6. The negative electrode active material of claim 3, wherein the metal compound is included in an amount of 1 wt % to 60 wt % based on a total weight of the core.

7. The negative electrode active material of claim 1, wherein a thickness of the intermediate layer is 1 nm to 100 nm.

8. The negative electrode active material of claim 1, wherein a thickness of the carbon coating layer is 1 nm to 100 nm.

9. A negative electrode comprising the negative electrode active material of claim 1.

10. A secondary battery comprising:
the negative electrode of claim 9;
a positive electrode;
a separator disposed between the positive electrode and the negative electrode; and
an electrolyte.

11. A battery module comprising the secondary battery of claim 10 as a unit cell.

12. A battery pack comprising the battery module of claim 11, and used as a power source of a device.

13. The battery pack of claim 12, wherein the device is an electric vehicle, a hybrid electric vehicle, a plug-in hybrid electric vehicle, or a power storage system.

14. The negative electrode active material of claim 1, wherein the carbon coating layer is formed on at least a portion of the intermediate layer by applying a combination of methane gas and ammonia gas by chemical vapor deposition.

* * * * *